Aug. 25, 1953   D. LLOYD   2,650,344
MAGNETIC TESTING APPARATUS
Filed March 22, 1949   3 Sheets-Sheet 1
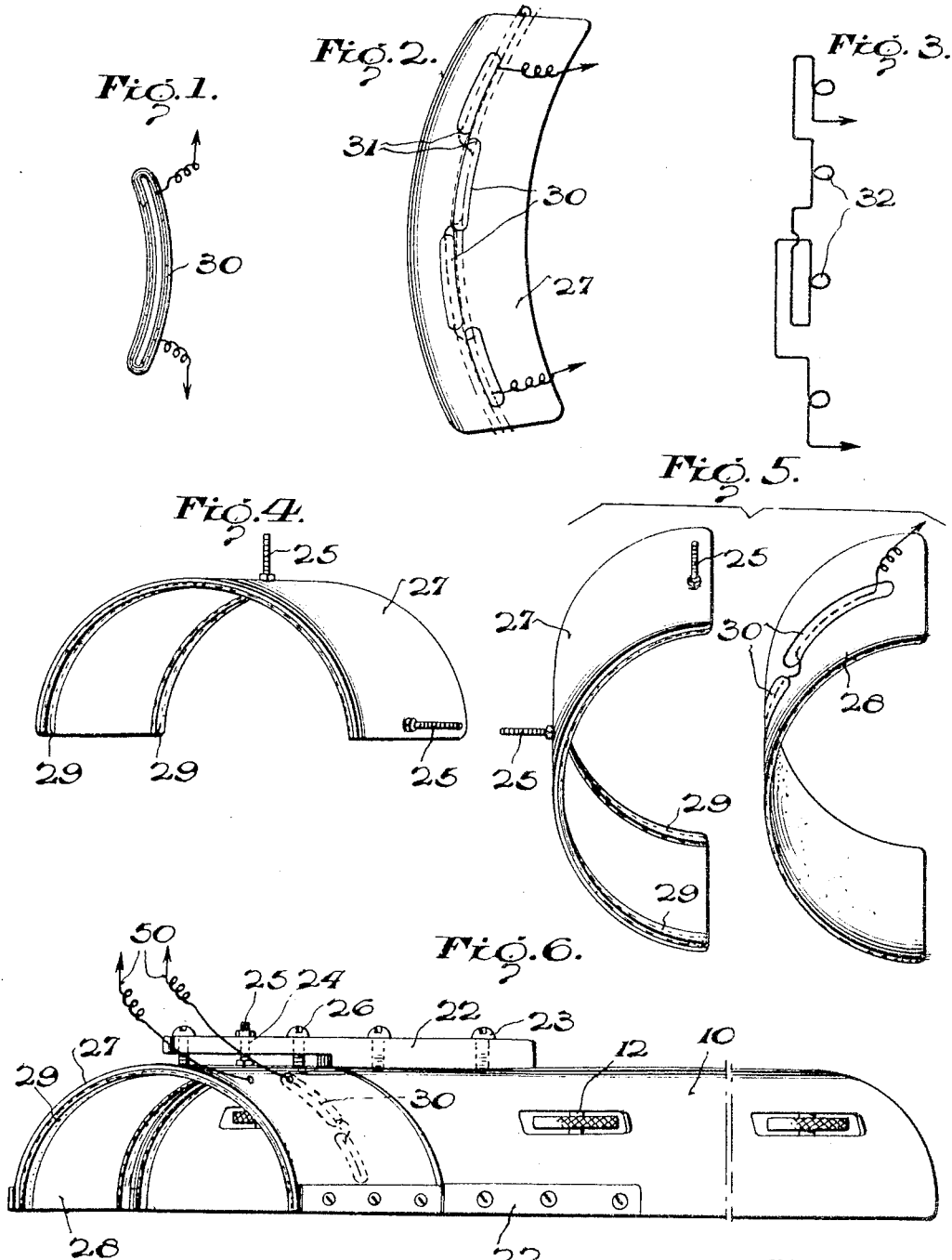
INVENTOR.
Donald Lloyd.
BY
Cameron, Kerkam & Sutton
ATTORNEYS

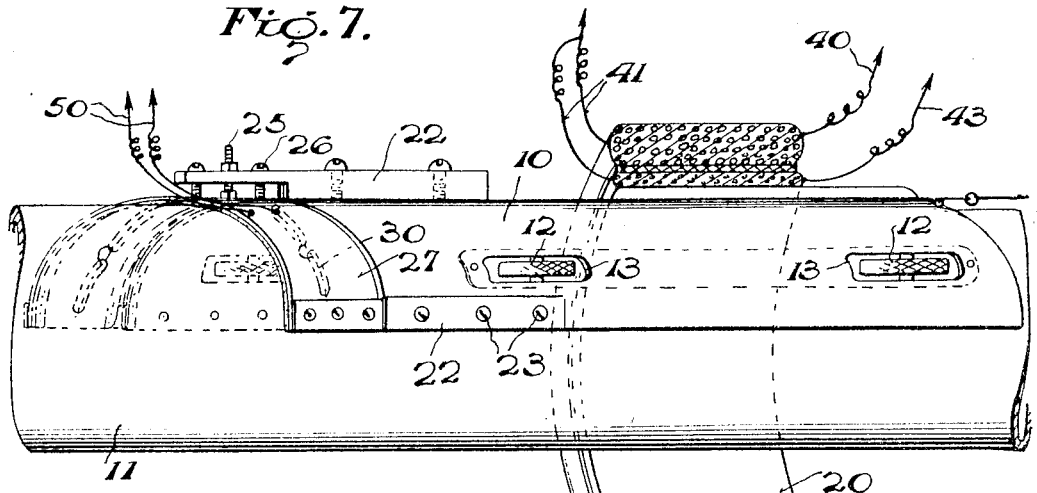
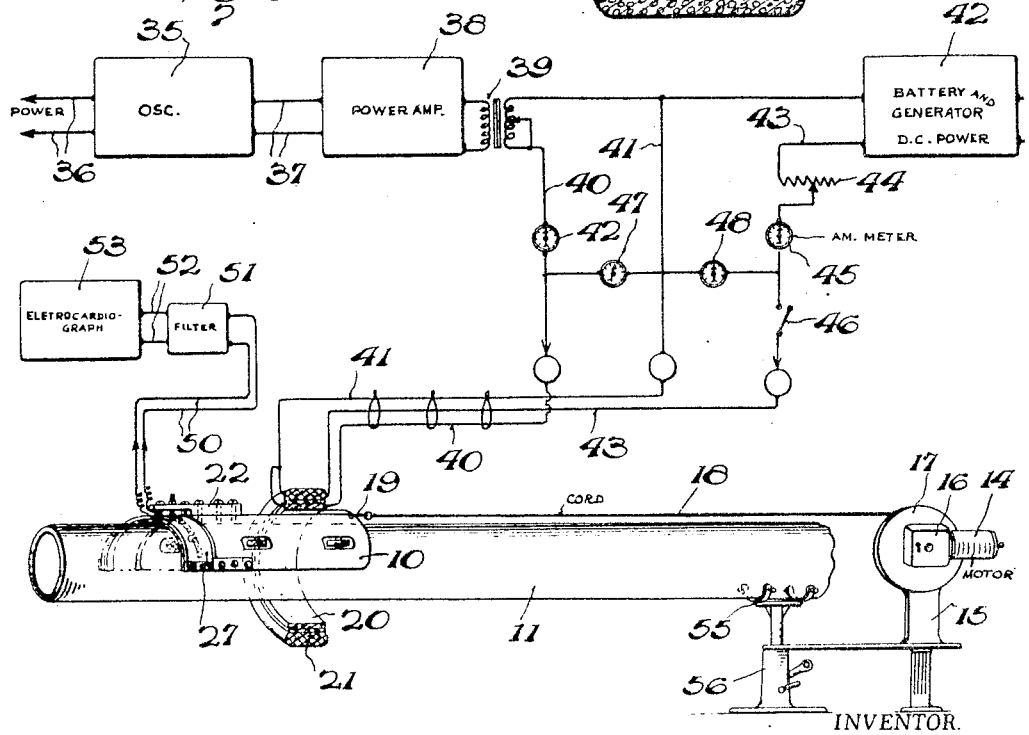

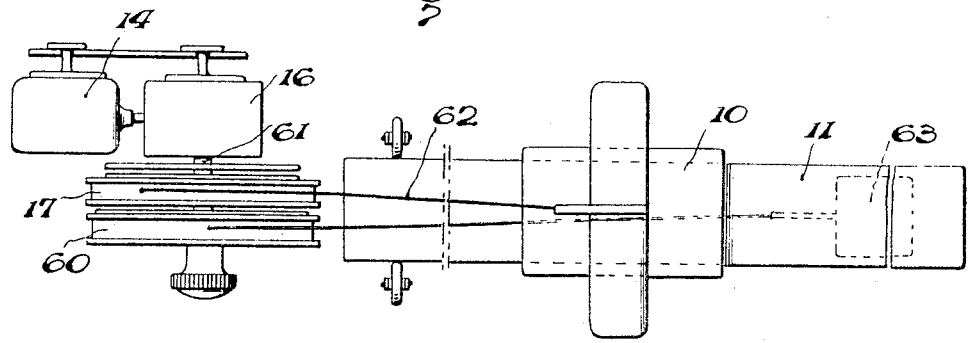
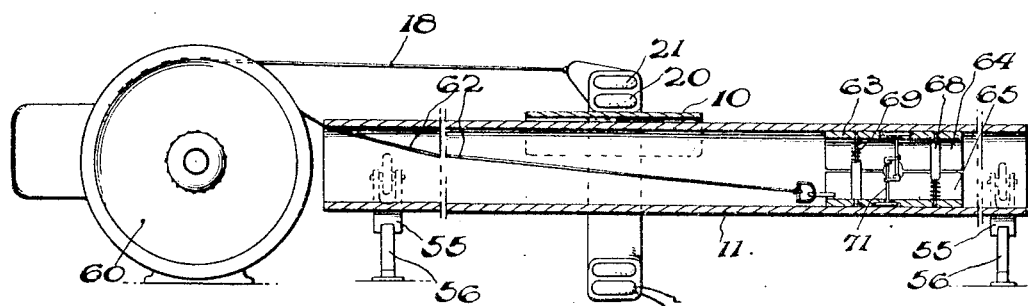
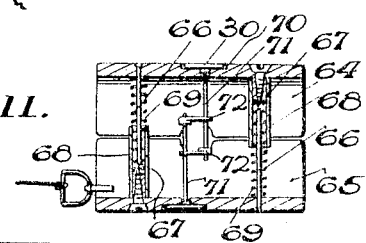
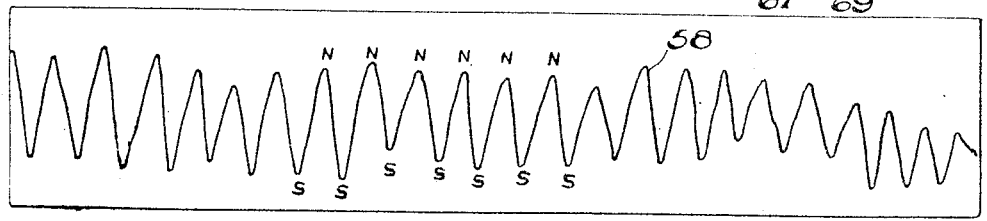

Patented Aug. 25, 1953

2,650,344

UNITED STATES PATENT OFFICE 2,650,344

MAGNETIC TESTING APPARATUS

Donald Lloyd, Oklahoma City, Okla., assignor, by mesne assignments, to Tuboscope Company, Harris County, Tex., a corporation of Delaware Application March 22, 1949, Serial No. 82,714

11 Claims. (Cl. 324—37)

This invention relates to a method and apparatus for analyzing ferromagnetic products, which term is used to include products of nickel and cobalt as well as iron or steel, for the purpose of producing a log to show certain physical characteristics of the specimen under examination, as the presence of fatigue cracks, slag intrusions, holes, laps, seams, conditions of stress, and other conditions representing structural change, structural parting, abrupt variations in thickness, etc. The invention possesses particular utility in producing a log to show such physical characteristics of tubular products, and therefore will be explained by reference to its embodiment in a method and apparatus for this purpose. However, it is to be expressly understood that the invention is not limited to the logging of tubular products, as it can be applied to the examination of solid bars, rods, sheets, etc. Furthermore, by way of exemplification, particular attention will be given herein to the application of the invention to the detection of metal partings, such as fatigue cracks and the like, but it is to be expressly understood that the invention is not limited to this use as it can be equally applied to the detection of deteriorations in structure, such as may arise from stress concentrations, or to the detection of abrupt variations in cross section, such as may arise from pits, holes, laps, seams, slag intrusions, etc., proper regard being given to the parameters of the detecting and amplifying equipment.

In theory, it is sometimes assumed that when a piece of metal is progressively magnetized from one end to the other, the elementary magnets thereof are uniformly reorientated so as to set up north and south poles at the extremities of the specimen with a uniformly varying intensity of magnetization in between. As a practical matter, however, such rarely if ever occurs, and an examination of the intensity of magnetic forces lengthwise of a specimen shows marked irregularity thereof. For example, taking drill pipe by way of illustration, if the drill pipe is stacked so that lengths of pipe are in contact with each other, in contact with a ferrometallic support, etc., magnetic energy is either given up or absorbed by each length of pipe at points of contact so that the distribution of magnetic force therein is irregular, and even though the specimen be subsequently progressively magnetized the distribution of magnetic force along the pipe remains irregular. Such irregularities may be at least reduced by passing an electric current lengthwise through the pipe, but they cannot be entirely removed within the limitations of practical operation.

It has been discovered that if a ferromagnetic specimen is vibrated in any suitable way, as by sound waves, electrical pulsations, etc., while it is being magnetized, the elementary magnets of the specimen orientate themselves into groups which are of substantially uniform length, the length of the groups being related to the structural characteristics of the material, with the contiguous ends of alternate groups having opposing north poles and opposing south poles, but the length of these groups appears to be independent of the frequency of the vibration to which the specimen is subjected. Accordingly, a log of the intensity of the magnetic energy of a specimen which is entirely homogeneous and of like structure throughout, and which has been vibrated during magnetization, is substantially a sinusoidal curve whose oscillations are of substantially equal amplitude and frequency, as illustrated in Fig. 12.

If there is a metal parting, the vibratory waves, as sound waves, will set up stress at that location and a local condition of polarization will exist. For example, taking a fatigue crack by way of illustration, local north and south poles will exist at opposite edges of the crack, and there will be leakage of magnetic flux from the opposite edges of the crack, producing magnetic lines of force in the air at and adjacent to the crack and also deformation of the magnetic lines of force in the metal around the crack. If there is an abrupt change in thickness or a concentration of stress there is a resultant variation in the intensity of magnetization at that location.

It is an object of this invention to provide a method and apparatus for electrically analyzing a ferromagnetic specimen which utilize combined magnetization and vibration to orientate the elementary magnets of the specimen into groups as referred to.

Another object of this invention is to provide a method and apparatus for magnetizing a ferromagnetic specimen under vibration so that the location of changes in the physical characteristics of the specimen which produce conditions of local polarization and variations in the intensity of magnetization as above referred to can be readily detected electrically.

Another object of this invention is to provide a method and apparatus for detecting the aforesaid conditions of local polarization and variations in the intensity of magnetization and producing a log thereof such that not only the presence and location of the condition producing local polarization and variations in the intensity of magnetization may be readily determinable from the log but also the size and character of the cause thereof.

Another object of this invention is to produce a method and apparatus as characterized which utilizes detecting apparatus that is not responsive to the uniform orientation of the elementary magnets into groups as referred to but is sensitively responsive to the presence of conditions of local polarization and variations in the intensity of magnetization for the purpose of detecting metal partings, concentrations of stress, abrupt changes in thickness, etc.

Another object of this invention is to provide a method and apparatus as characterized which is readily applicable to field service so that specimens of ferromagnetic material may be readily logged to determine their physical characteristics, as for example, to detect defects before use, or to detect cracks or stress concentrations after use so as to forestall breakage in service, etc.

Another object of this invention is to provide a method and apparatus as characterized which provides a log that is readily interpretable as to the location and character of the cause of the local polarization and variations in the intensity of magnetization without substantial disturbing indications being present in the log to make difficult the interpretation thereof.

Another object of this invention is to provide an apparatus as characterized which is relatively simple in construction so that it may be properly set up, adjusted and operated without requiring the skill of highly technical men.

Other objects will appear as the description of the invention proceeds.

Stated broadly, the apparatus consists essentially of a pickup device, of particular construction to be hereinafter explained, which is mounted for movement lengthwise of the specimen. Associated with said pickup device is a magnetizing coil and a pulsating coil which, as hereinafter explained, must be spaced from the pickup device by a definite and critical distance. The pickup device and the magnetizing and pulsating coils are moved as a unit lengthwise of the pipe at a substantially uniform speed and without substantial lateral motion, the rate at which the unit moves over the specimen being rather critical. The pickup device is of such construction that no voltage is generated therein as long as the changes in the lines of magnetic force equally affect all of the coils of the device, but upon encountering a condition of local polarization or variation in the intensity of magnetization, such as may arise from a metal parting, a concentration of stress or an abrupt change in metal thickness, voltage is generated in the pickup device, which is properly amplified and utilized in a recorder to produce a graph having a pip therein at a location corresponding to the location of the condition of localized polarization or variation in the intensity of magnetization. Thereby the presence of the condition causing the localized change in the magnetic lines of force as well as the location thereof is visually indicated on the log, the indication also being of such character as to afford information as to the width and character of the crack, intrusion, stress concentration, etc., which has caused the localized change in the magnetic lines of force. The minimum conditions under which a recordable indication of a change in the magnetic lines of force will be shown will vary with the material of the specimen, the characteristics of the recorder, etc. It is preferred that the log be capable of showing at least a variation in magnetic flux of 1000 Maxwells per second. The voltage from the pickup device is first preferably passed through suitable filtering means to minimize the influence of responses to conditions other than those being investigated, as for example responses to the detecting device rubbing on the specimen, effects of small lateral movements of the detecting device, etc., and then the filtered response is passed into a highly sensitive, properly damped and adequately stable amplifying and recording device such as may be found in electrocardiographs available on the market. As such electrocardiographs now in use ordinarily have an amplification factor of only 15,000, an additional stage of cascade amplification is preferably added thereto so as to increase the possible amplification to a factor on the order of 30,000, but to avoid instability the amplification factor actually used in making the log is on the order of 20,000. The recorder is driven synchronously with the carriage carrying the pickup unit and the magnetizing and pulsating coils so that a direct correlation exists between the graph or log and the specimen in the direction of their lengths.

The invention is capable of receiving a variety of expressions only two of which have been illustrated on the accompanying drawings, and it is therefore to be expressly understood that the drawings are for purposes of illustration only, and are not to be construed as a definition of the limits of the invention, reference being had to the appended claims for that purpose.

Referring in detail to the accompanying drawings, wherein the same reference characters are used in the several figures to indicate corresponding parts, Fig. 1 is a diagrammatic view of a preferred form of coil to be used in the pickup device;

Fig. 2 is a diagrammatic view of the pickup coils and their supporting member;

Fig. 3 is a diagram to illustrate the electrical winding of the coils in the pickup device;

Fig. 4 is a diagrammatic perspective view of the backing member on which the supporting member of Fig. 2 is mounted;

Fig. 5 is an exploded view of the component parts of the pickup unit;

Fig. 6 is a diagrammatic perspective view of the pickup unit and the carriage on which it is mounted;

Fig. 7 is a diagrammatic perspective view of the pickup unit and carriage together with the magnetizing and pulsating coils also carried by the latter;

Fig. 8 is a diagrammatic view of the movable parts of the detecting, magnetizing and pulsating instrumentalities together with a suitable electric diagram therefor;

Fig. 9 is a diagrammatic plan view of another embodiment of the present invention;

Fig. 10 is a sectional view of the embodiment of Fig. 9;

Fig. 11 is a diagrammatic view to a somewhat enlarged scale of the pickup unit of Figs. 9 and 10; and Fig. 12 is a graph of magnetic intensity to illustrate the distribution of magnetic force when a specimen is vibrated while being magnetized.

Exemplifying the application of the invention to the logging of a tubular steel product, the apparatus for simultaneously magnetizing and vibrating the specimen and detecting conditions of local polarization and variation in the intensity of magnetization therein may be constructed to pass lengthwise over the exterior of the tubular specimen or it may be constructed to move lengthwise of the interior thereof. As the principle is the same in either case the invention will first be explained by reference to an embodiment wherein said apparatus is moved exteriorly of the tubular specimen.

Referring now more particularly to the drawings, Figs. 1 to 8 inclusive illustrate an embodiment of the present invention, for practicing the method thereof, of a type appropriate to the logging of a tubular ferromagnetic specimen, such for example as a steel drill pipe. In the form shown, 10 designates a carriage of any suitable construction adapted to be moved lengthwise of the specimen and carrying the magnetizing and pulsating coils and also the pickup unit heretofore referred to. While the carriage may be constructed to completely embrace the specimen 11, the illustrated embodiment is of semicircular form to facilitate speedy logging of the specimen even though this requires that the detecting apparatus be passed twice along the length of the specimen in order to log the specimen throughout its circumference. Carriage 10 is of such radius of curvature that it conforms with the curvature of the exterior of the specimen so that it will slide on the exterior of the specimen as it is pulled lengthwise thereover, and to reduce frictional resistance to the lengthwise movement of the carriage, said carriage is provided with a suitable number of ball or roller bearings 12, supported in any suitable way in openings 13 of the carriage, so as to make rolling contact with the periphery of the specimen. Said carriage may also be made of any suitable material but it is preferably in the form of an aluminum or brass shell having a thickness on the order of 1/8" to afford desired rigidity without undue weight.

Any suitable means may be provided for moving carriage 10 lengthwise of the specimen 11 at a uniform rate of speed within the critical limits hereinafter explained and under conditions that will introduce a minimum amount of lateral movement of the carriage. As diagrammatically illustrated in Fig. 8 an electric motor 14 is mounted on any suitable standard 15 and has associated therewith speed reducing gearing 16 through which a pulley 17 is driven. A cable or the like 18 is attached at 19 to one end of the carriage in the medial axial plane thereof, so that as the cable is wound on the pulley the carriage is pulled at a substantially uniform rate of speed along the specimen 11.

Mounted on the carriage 10 in any suitable way at or adjacent the end thereof, the leading end in the embodiment illustrated, are the pulsating coil 20 and the magnetizing coil 21 hereinbefore referred to. They need not be concentrically arranged with the test specimen but are preferably concentrically arranged with respect to each other.

Coil 20 is desirably made of 75 turns of No. 18 enameled copper wire and is connected to a source of alternating current such as an oscillator, so that the specimen is set into vibration by the flux therefrom, a preferred frequency being on the order of 500 cycles per second.

The magnetizing coil 21 is connected to a suitable source of direct current. The vector sum of the alternating current in coil 20 and the direct current in coil 21 provides a pulsating magnetic field which inductively magnetizes and vibrates the specimen as the carriage 10 moves lengthwise of the specimen.

The magnetizing force supplied by the coil 21 is critical. The failure of researchers in this field to realize that there is both an upper limit and a lower limit to the magnetizing force, outside of which satisfactory operation is impossible, has contributed to their failure to make instruments of practical value—instruments which will detect very small flaws. The preferable magnetizing force for testing drill pipe is on the order of 2000 ampere turns per square inch of metal cross section of the test specimen. This may be obtained when testing such pipe with a coil of 500 turns of No. 12 enameled copper wire. Operation is possible within a reasonably wide range of magnetizing force in the specimen, but is not truly satisfactory outside the range of 1500 to 2000 gauss per square inch of metal cross section when the specimen has a magnetic permeability similar to that of drill pipe. The optimum is in the range just at or slightly below the knee in the magnetic permeability curve of the specimen.

Suitably secured to the carriage 10 at that end thereof which is opposite the pulsating and magnetizing coils is a plurality of axially extending arms 22, here shown as three in number, suitably attached to the carriage as by machine screws or the like 23. The free end of each arm as shown is reduced in thickness radially of the carriage and provided with an aperture 24 to receive a bolt 25 on the backing member of the pickup unit next to be described, each arm being also provided with adjusting screws 26 so that the pickup unit can be rigidly supported on the carriage and at the same time adjusted so that it will have accurate concentricity with the specimen.

The pickup unit includes a semicircular backing member 27 and a semicircular coil supporting member 28—see Figs. 4 and 5. Backing member 27 is preferably made of aluminum or copper sheet on the order of 1/8" in thickness, and it is provided with one or more bolts 25 as above referred to. At each semicircular end of its concave face there is mounted thereon, as by cementing, a strip 29 of rubber or other suitable elastic material, a preferred strip being one of rectangular cross section of about 1/4" by 1/4". Secured to the backing member 27 by means of said strips 29, as by cementing, is the aforesaid coil supporting member 28 which is also preferably made of aluminum or brass sheet, but which has a thickness on the order of .01" so that the coils carried by member 28 will be disposed as closely as possible to the exterior face of the specimen. Member 28 has a radius of curvature conforming with the specimen so that it may slide on the outer surface of the specimen, and member 27 has a corresponding radius of curvature so as to provide with member 28 an intermediate parallel-walled arcuate chamber in which the pickup coils to be described are disposed after they are attached to the convex face of the member 28. Member 28 may thus be readily detached from member 27 when it has to be replaced due to wear from rubbing engagement with specimens.

Considering by way of illustration the detection of fatigue cracks in a specimen, such cracks are usually very small and the detectable flux leakage at such a crack is frequently restricted to an area on the order of .01" in width and ⅛″ to ¼″ in length. In order that the lines of magnetic leakage and the distortion of the magnetic lines in the material may be detected under such conditions, the pickup coil should have as many turns as possible cut by the lines of force due to flux leakage and distortion at the crack without being of such physical size as to extend undesirably outside of the zone of flux leakage due to the presence of the cracks. It is also desirable that the coil have a sensitivity such that it will respond to a change of magnetic flux of 1000 Maxwells per second. It has been found that a coil composed of one hundred turns of number forty wire wound into a hairpin shape, as shown more particularly at 30 in Figure 1, of approximately 1½″ in length and having a spacing between the opposed reaches of the windings on the order of 1/64″, satisfies the foregoing specifications. However, by using a smaller wire, as No. 44 for example, more turns could be added to the pickup coil with increased sensitivity in the detection of flux leakage. The pickup device must also be capable of detecting such a crack at any circumferential point in the area being logged. Therefore, the pickup device is composed of a series of the aforesaid coils 30 disposed circumferentially of the specimen, the series preferably being of such length as to embrace 180° of the specimen being investigated. The coils of said series may be arranged in circumferential alignment but it is preferred to stagger them as shown at 31 in Fig. 2. Alternate coils of the series are wound in opposite senses and connected together so that each coil bucks or compensates for each adjacent coil, the winding of alternate coils of the series being diagrammatically indicated at 32 in Fig. 3.

Therefore, when the pickup device is passed along a specimen which has been magnetized under vibration and wherein the variation in the lines of magnetic force lengthwise of the specimen is uniform in all radial planes through the specimen, as exists in the absence of conditions of local polarization or variation in the intensity of magnetization due to the presence of a crack, stress concentration, abrupt change in thickness, etc., as hereinafter explained in greater detail, no voltage is generated in the series of pickup coils because each coil compensates for the adjacent coil. But if the series of pickup coils encounters a condition of local polarization or variation in the intensity of magnetization as above referred to, a potential is generated in that coil which passes over the area of localized polarization or variation in the intensity of magnetization because that coil cuts the lines of magnetic force emanating therefrom, and as this voltage is not compensated for by the adjacent coils, a voltage is generated in the pickup device which is available upon amplification to actuate recording means as hereinafter referred to.

As is apparent, the pickup coils should not make any substantial response to magnetic lines of force deriving from the magnetizing and pulsating coils. As the lines of force diminish rapidly with distance it can be shown that the spacing between the pickup coils, on the one hand, and the magnetizing and pulsating coils, on the other hand, should be at least 3″ in order that the pickup coils shall not respond to lines of force from the magnetizing and pulsating coils, and the preferred distance used is on the order of 4″.

Referring now to Fig. 8, there is illustrated a suitable electric diagram for energizing the pulsating coil 20 and the magnetizing coil 21. As here shown, an oscillator 35 is connected to any suitable power mains 36, and in turn is connected through leads 37 to any suitable power amplifier 38. From the amplifier 38 energy is fed to a transformer 39 which preferably matches the impedance of the pulsating coil 20. As this impedance varies with different specimens said transformer 39 should be of a variable type, for example preferably covering a range of approximately 7 to 15 ohms when the pulsating coil 20 is formed as above referred to in which event it would have an impedance in the neighborhood of 10 ohms. Energy from the transformer 39 is fed through lines 40 and 41 to the coil 20, and an alternating current ampere meter 42 is preferably interposed in the line 40. Any suitable source of direct current, as a battey or generator diagrammatically indicated at 62, is connected to the magnetizing coil 21 through the aforesaid line 41 and through a line 43, line 43 including an adjustable rheostat 44, a direct current ampere meter 45 and a switch 46. Voltmeters 47 and 48 may be respectively cross connected between lines 40 and 41 and between lines 41 and 43.

Extending from the pickup device as heretofore described are leads 50 extending to a suitable amplifying recorder. As the series of pickup coils is highly responsive to abrupt changes in the magnetic flux, it is obviously desirable that the log made shall not include responses due to the generation of voltage from other causes than the physical characteristics, such for example as the presence of fatigue cracks, being investigated. The rubbing of the carriage on the specimen or any slight sidewise movements of the pickup device may produce responses in the pickup coils, and if such responses are of sufficient magnitude they may obscure the presence of those pips in the log which are due to the presence of fatigue cracks, for example. Therefore, the current from the pickup device is preferably passed by the leads 50 through a filter 51 of any suitable character to filter out undesired voltage responses.

From the filter 51 the generated voltage is passed through leads 52 to an amplifying recorder, diagrammatically indicated at 53, and which may be any suitable electrocardiograph available on the market that will amplify both the negative and positive portions of the impulses with equal vigor, will provide a well damped system so as to prevent distortion of the recorded impulses and will be well compensated so as to provide an accurate log of the variations of voltage arising in the pickup device. As such electrocardiographs are well known and the details thereof constitute no part of the present invention, the structural details thereof have not been illustrated. However, electrocardiographs as now available on the market usually have a factor of amplification on the order of 15,000, whereas in making a log showing the location and character of the conditions of local polarization and variations in the intensity of magnetization it is desirable, in order that the log may be readily interpreted, that the amplifying factor be at least 20,000. This may readily be effected by adding to commerical electrocardiographs a further stage of cascade amplification so as to double the amplification factor of the instrument, and then in order to avoid instability and oversensitivity, operating the instrument with an amplification factor on the order of 20,000.

The speed at which the carriage with the pickup unit thereon is moved lengthwise of the specimen is largely limited by the frequency response of the amplifying recorder 53. For purposes of illustration assume the use of an electrocardiograph having a frequency response on the order of 150 to 500 cycles per second. Experience has demonstrated that the flux leakage due to fatigue cracks, for example, likely to be encountered in practice may have a detectable width on the order of .01" to $\frac{1}{32}$". It can readily be shown that for a fatigue crack producing a detectable flux leakage over a width of $\frac{1}{32}$", the pickup coils will produce pulses which are outside of the range of frequency response of the amplifier as above assumed if the carriage 10 is moved at 20 linear feet per minute. Similarly, it can be shown that for a fatigue crack producing a detectable flux leakage over a width of .01" the pickup coils will produce pulses which are outside of the frequency response of the amplifier as above assumed if the carriage is moved at 30 linear feet per minute. Therefore, the movement of the carriage lengthwise of the specimen must lie between these limits when the frequency response of the amplifying recorder has the foregoing limitations, although as will be apparent if the amplifying recorder has other limits of frequency response other speeds of movement lengthwise of the specimen become available. A linear speed on the order of 25 feet per minute has thus been found to be rather critical for assuring response to the different sizes of fatigue cracks likely to be encountered.

This speed of linear movement is also found to be desirable for a further reason. It is apparent that the width of the base of a pip in the graph should be as wide as possible for a crack at the upper limit of widths of detectable flux leakage likely to be encountered, and proportionately narrower for narrower cracks, so that the nature of the crack can be estimated, and it is also obviously desirable that the pip be relatively large in the direction at right angles to the general direction of the graph, i. e., that the height of the pip be great, so as to be readily distinguishable. If the height and the width of the bases of the pipe at different linear speeds are plotted it is found that the two graphs cross each other at approximately 25 linear feet per minute. Therefore, using this speed of translation of the carriage provides optimum values for maximum width of pip and maximum amplification thereof.

The amplifying recorder makes its graph on a record sheet which is moved lengthwise at a rate of speed which is synchronized with the rate of speed of the carriage with its pickup device. Therefore, if motor 14 does not drive the record sheet the motor for driving the latter is synchronized with the motor 14 so that the log lengthwise thereof affords an accurate means for correlation with the length of the specimen.

To exemplify the use of the method and apparatus embodying the present invention, assume that a piece of steel drill pipe is to be examined for the presence of fatigue cracks. The piece of pipe is supported on suitable cradles 55 mounted adjustably on standards 56 which may be carried by the same bedplate as carries the support 15 for the electric motor 14. Carriage 10 is disposed at the left-hand extremity of the specimen 11, as viewed in Fig. 8, with the coils 20 and 21 over or adjacent to the end of the pipe. The cable 18 is attached to the carriage at 19 in the medial axial plane of the carriage with the cable 18 substantially horizontal, the cradles 55 being adjusted if necessary to attain this end.

The electric motor 14 is then started, and through the gearing 16 and pulley 17 the cable 18 is drawn to the right as viewed in Fig. 8, moving the carriage 10 along the specimen at a uniform rate of speed, on the order of 25 linear feet per minute as above explained, the location of the cable being such as to introduce a minimum of deviation from a true rectilinear motion of the carriage. During this movement of the carriage it slides with minimum friction on the exterior surface of the pipe, the rollers 12 minimizing friction during this movement of translation. Upon starting the motor 14, the motor of the electrocardiograph 53 is also started, and as synchronous motors are provided for the two drives the log sheet of the amplifying recorder is moved in synchronism with the movement of the carriage 10.

The before described circuits through the coils 20 and 21 having been closed, alternating current from the oscillator 35 is amplified at 38 and delivered to the transformer 39 whence it flows through the lines 40 and 41 to the pulsating coil 20, setting up vibrations in the specimen on the order of 500 cycles per second. Simultaneously, direct current is drawn from the battery or generator 42 and supplied through lines 41 and 43 to the magnetizing coil 21, thereby producing in conjunction with the alternating current in coil 20 a pulsating current of such magnitude as to induce magnetization in the specimen of a value which corresponds to a point just below the knee of the above referred to graph plotting the intensity of magnetization against the magnetizing force of the particular coil being used. As the coils 20 and 21 move along the length of the pipe 11 irregularities of distribution of magnetizing force in the specimen 11 are wiped out and the elementary magnets of the metal are caused to be reorientated into magnetic groups of substantially equal length.

Assuming a specimen of steel drill pipe which is magnetized while being vibrated and which is substantially homogeneous throughout, without the presence of fatigue cracks and other conditions producing local polarization and variations in the intensity of magnetization, Fig. 12 is a substantial reproduction of a graph of the intensity of magnetization induced therein, showing the reorientation of the elementary magnets, derived from an actual specimen. It will be observed from the graph 58 of Fig. 12 that the resulting groups of elementary magnets are arranged so that adjacent pairs have contiguous north poles and contiguous south poles as indicated at N and S, respectively. It will also be observed from the graph 58 that the lengths of the groups of elementary magnets are fairly uniform, it having been discovered by comparing such a graph with the graph of hardness of the metal that the variations in the lengths of the groups appear to correspond with variations in the density of the metal. From the foregoing it will be perceived that as the carriage 10 moves from one end of the piece of pipe to the other the combined action of the magnetizing and pulsating coils is to progressively reorientate the elementary magnets of the specimen so that the intensity of the magnetic lines of force along the length of the specimen is generally represented by a sinusoidal curve.

As the carriage 10 moves to the right as viewed in Fig. 8 the pickup unit composed of the supporting plate 28, the backing plate 27 and the series of coils 30 is caused to slide along the exterior surface of the specimen at the before mentioned rate of speed on the order of 25 feet per minute. As the series of pickup coils 30 is spaced from the pulsating and magnetizing coils 20, 21 by at least a distance of 3", and preferably by a distance of 4", the pickup coils are substantially unaffected by lines of force emanating from the coils 20 and 21. As the supporting plate is sliding on the surface of the specimen and is only .01" in thickness the series of coils 30 are very close to the surface of the specimen so that they are in a position to be intimately affected by variations in the magnetic lines of force in and around the specimen. The rubber rings 29 provide an elastic mounting for the supporting plate 27 so that said plate may yield to the extent necessary when slight irregularities existing at the surface of the specimen are encountered.

As the intensity of the magnetic lines of force, although varying lengthwise of the specimen as indicated in the graph 50 of Fig. 12, is substantially uniform in any plane at right angles to the axis of the specimen, as long as the metal is homogeneous and there is absent any condition causing local polarization or variation in the intensity of magnetization, the series of coils 30 do not respond to variations in the intensity of the magnetic flux due to the magnetic groups because of the fact that the coils in the series are so constructed and wound that each coil bucks or compensates for the preceding coil in the series so that no voltage is induced in the series due to the coils cutting the lines of magnetic force. When a condition of local polarization or variation in the intensity of magnetization is encountered, however, the coil passing over the area involved has induced therein a voltage because of the abrupt change in the lines of magnetic force being cut at this location. As this voltage last referred to is not compensated for by the other coils of the series, a voltage is generated which is delivered to the amplifying recorder 53, preferably through the filter 51 for reasons above explained, and a pip is produced in the log line. As each coil of the pickup unit is made to be so sensitive that it will respond to a change in the magnetic flux of 1000 Maxwells per second, a fatigue crack producing a detectable flux leakage as small as 1/100" in width and say 1/8" in length produces a response on the log whose location corresponds with the location of the crack lengthwise of the specimen while, for reasons above pointed out, due to the speed at which the pickup unit is being moved lengthwise of the specimen, the width of the pip at its base is an indication of the size of the crack while the magnitude of the pip at right angles to the length of the graph is such as to make such pip readily distinguishable from other indications on the graph that may be introduced by other factors. Therefore, the amplifying recorder 53 provides a log which on inspection shows accurately the location and character of the fatigue cracks lengthwise of the drill pipe being examined.

It should be observed that while some details of the structure can be varied, as hereinafter suggested, without departure from the scope of the invention, the very thing which has marked the success of this invention in field operations, where many have tried and failed with devices known to the prior art, is the combination of critical details hereinabove described. The invention is inoperative to reliably detect all small flaws if any one of the critical details is not constructed in accordance herewith, or if more than one of them is too far from the optimum though within the critical range.

It is sometimes desirable to have the pickup unit move over the interior surface of a tubular specimen, and Figs. 9, 10 and 11 illustrate diagrammatically an apparatus suitable for this purpose. As in the embodiment of Figs. 1 to 8 the specimen 11 is mounted on suitable cradles 55 carried by standards 56, and a carriage 10, on which is supported a pulsating coil 20 and magnetizing coil 21, is drawn by a cable or the like 18 that is wound on a pulley 17 driven by an electric motor 14 through suitable reducing gearing 16. As so far referred to, the parts may be of identical construction as described in conjunction with the embodiment of Figs. 1 to 8. In this apparatus, however, a second pulley 60 of the same size as pulley 17 is mounted coaxially with pulley 17 on the shaft 61 and has wound thereon a cable 62 running to a pickup unit, generally designated 63, which is to be pulled through the interior of the specimen.

As shown more particularly in Fig. 11 said pickup unit 63 is composed of a pair of substantially semicircular members 64 and 65 whose radius of curvature substantially conforms with the curvature of the interior of the specimen. Said semicircular members are urged apart so as to rub on the surface of the specimen. As shown said members are provided with rods 66 having heads 67 slidable in tubes 68 carried by the other member of the pair, and coil springs 69 surround the rods 66 and react between the heads 67 and the inner face of the member carrying said rods. Thereby the two halves of the unit are pressed radially outwardly into rubbing engagement with the interior surface of the specimen. Midway of the length of the members 64 and 65 a circular groove or recess 70 is provided, and in this circular recess is disposed a series of pickup coils 30, which may be of identical construction with the pickup coils described in conjunction with the embodiment of Figs. 1 to 8, which are so disposed as to lie closely to but not rub on the surface of the specimen. Other guide pins 71 may be provided on the members 64 and 65 and have sliding engagement in apertures provided in arms 72 at the end of the opposite pin of each pair so as to aid in assuring that any relative movement between the members 64 and 65 shall be only radial in character.

In operation the apparatus of Figs. 9, 10 and 11 is identical with that hereinabove explained with the exception that the pickup unit is moved along the interior of the tubular specimen synchronously with the movment of the carriage 10, the pickup unit being maintained at least 3" behind the coils on the carriage 10 and preferably being spaced therefrom by a distance of 4". As the coils 20, 21 move over the exterior of the specimen the elementary magnets of the specimen are formed into groups as heretofore explained, and as the series of pickup coils move along the specimen interiorly thereof, said coils are not affected by changes in magnetic flux which are uniform in a circumferential direction, but upon crossing the magnetic lines of force at any condition of local polarization or variation in the intensity of magnetization a voltage is generated in the pickup device that is transmitted to the amplifying recorder as heretofore explained in conjunction with the embodiment of Figs. 1 to 8.

It will therefore be perceived that the present invention provides a method and apparatus for electrically analyzing ferromagnetic specimens which utilize magnetization under vibration to reorientate the elementary magnets of the specimen into groups and then electrically analyzing the magnetic lines of force to determine the location of conditions which produce conditions of local polarization and variations in the intensity of magnetization. Not only is the location of such conditions accurately indicated on the log which is formed, but the log is such as to give information as to the size and character of the cause thereof. Thereby metal partings, concentrations of stress, abrupt changes in thickness, etc., may be readily detected in a specimen either before it is put into service or for the purpose of detecting deteriorations after a period of service. The method and apparatus are also such that they may be readily applied in the field without the necessity of using the skill of highly technical men and the log produced is such as to be readily interpretable for the purpose of determining the physical condition of the specimen.

While the embodiments of the invention illustrated on the drawings have been described with considerable particularity, it is to be expressly understood that the invention is not limited thereto, as the invention is capable of receiving a variety of expressions as will now be apparent to those skilled in the art, while changes in details of construction, arrangement, proportion, dimension, materials, etc., may be made, and parts may be replaced by equivalent parts, without departing from the spirit of this invention. While the invention has been explained with particular regard to its use in connection with a hollow specimen, it will now be apparent that the invention may be readily applied to detecting causes of local polarization and variations in the intensity of magnetization in solid specimens, such as bars, rods, sheets, etc., of whatever cross section. Also, while the invention has been explained by illustrating its application to the detection of fatigue cracks in a specimen, it will be apparent that the invention is not limited thereto but can be applied to the detection of other causes of local polarization and variations in the intensity of magnetization, in which event changes may be made in the electrical parameters of the system to bring out accurately in the resulting log the conditions which cause the local polarization or variations in the intensity of magnetization, having regard for the response of the pickup device due to the variations in the lines of magnetic force arising from the conditions under investigation. Accordingly, the invention in its broad aspects involves the reorientating of the elementary magnets of a specimen into magnetic groups by magnetizing the specimen while under vibration so that conditions producing local polarization and variations in the intensity of magnetization are subject to detection and interpretation. Reference is therefore to be had to the claims hereto appended for a definition of the invention.

What is claimed is:

1. In an apparatus of the character described, a hollow semi-cylindrical carriage to be moved lengthwise of the specimen to be tested, bearings mounted in said carriage and engaging the specimen, a vibrating coil mounted adjacent one end of said carriage and surrounding said carriage and the specimen to be tested, a magnetizing coil mounted outside of and surrounding said vibrating coil, a pick-up unit spaced from the other end of said carriage and means for adjustably securing said pick-up unit to said carriage.

2. Apparatus as described in claim 1 in which said pick-up unit includes a backing member having the same curvature as said carriage and supported by said securing means, a coil supporting member mounted within said backing member, coils mounted on said supporting member between said supporting member and said backing member and resilient strips separating said backing member and said supporting member.

3. Apparatus as described in claim 1 in which said adjustable securing means include a plurality of arms secured to and extending axially over the adjacent end of said carriage, the free ends of said arms being of reduced thickness, bolts passing through said arms and securing said pick-up unit thereto, and adjustable screws carried by said arms and engaging said pick-up unit to adjust the same for accurate concentricity with the specimen.

4. Apparatus as described in claim 1 in which said pick-up unit includes a hollow metallic shell supported by said securing means and having the same curvature as said carriage and a plurality of pick-up coils mounted within said shell.

5. In apparatus of the character described, a carriage shaped to partially embrace the specimen to be tested and adapted to be moved lengthwise thereof, a vibrating coil mounted adjacent one end of said carriage and surrounding said carriage and the specimen, a magnetizing coil mounted outside of and surrounding said vibrating coil, a pick-up unit spaced from the other end of said carriage, and means for adjustably securing said pick-up unit to said carriage.

6. In apparatus of the character described including, an oscillator, a source of direct current and an amplifying electrocardiograph, a carriage shaped to partially embrace the specimen to be tested and adapted to be moved lengthwise thereof, a vibrating coil mounted adjacent one end of said carriage surrounding said carriage and the specimen and connected to the oscillator, a magnetizing coil mounted outside of and surrounding said vibrating coil and connected to the source of direct current, a pick-up unit spaced from the other end of said carriage and connected to said electrocardiograph and means for adjustably securing said pick-up unit to said carriage.

7. In apparatus of the character described including an oscillator, a source of direct current, an amplifying electrocardiograph and a constant speed motor means, a carriage shaped to partially embrace the specimen to be tested and adapted to be moved lengthwise thereof by the motor means, a vibrating coil mounted adjacent one end of said carriage surrounding said carriage and the specimen and connected to the oscillator, a magnetizing coil mounted outside of and surrounding said vibrating coil and connected to the source of direct current, a pick-up unit spaced from the other end of said carriage and connected to said electrocardiograph and means for adjustably securing said pick-up unit to said carriage.

8. In apparatus of the character described, a carriage shaped to partially embrace the specimen to be tested and adapted to be moved lengthwise thereof, a vibrating coil mounted adjacent one end of said carriage and surrounding said carriage and the specimen, a magnetizing coil mounted outside of and surrounding said vibrating coil, a pick-up unit spaced from the other end of said carriage, means for adjustably securing said pick-up unit to said carriage, said securing means including a plurality of arms secured to said carriage and extending axially over the adjacent end thereof, and screw means carried by said arms and engaging said pick-up unit to adjust the same for accurate concentricity with the specimen.

9. In apparatus of the character described, a pair of pick-up coils of hairpin shape, said coils being wound in opposing senses, said coils being adapted for movement with relation to a test specimen, said coils being displaced substantially perpendicular to the direction of such movement, with the second end of the first coil approximately adjacent the first end of the second coil, and with the trailing edge of said first coil approximately in line with the leading edge of said second coil, the flat surface of said coils being in a plane parallel with the surface of the tested specimen.

10. In apparatus of the character described, a carriage shaped to partially embrace the specimen to be tested and adapted to be moved lengthwise thereof; a vibrating coil mounted adjacent one end of said carriage and surrounding said carriage and the specimen; a magnetizing coil mounted outside of and surrounding said vibrating coil; a pick-up unit spaced from the other end of said carriage; and means for adjustably securing said pick-up unit to said carriage; said pick-up unit including a backing member having the same shape as said carriage and supported by said securing means, a coil supporting member mounted within said backing member, and coils mounted on said supporting member adjacent said backing member.

11. In apparatus of the character described, a carriage shaped to partially embrace the specimen to be tested and adapted to be moved lengthwise thereof; a vibrating coil mounted adjacent one end of said carriage and surrounding said carriage and the specimen; a magnetizing coil mounted outside of and surrounding said vibrating coil; a pick-up unit spaced from the other end of said carriage; and means for adjustably securing said pick-up unit to said carriage; said pick-up unit including a hollow metallic shell supported by said securing means and having the same shape as said carriage and a plurality of pick-up coils mounted within said shell.

DONALD LLOYD.

References Cited in the file of this patent

UNITED STATES PATENTS

| Number | Name | Date |
| --- | --- | --- |
| 213,197 | Herring | Mar. 11, 1879 |
| 890,085 | McCann et al. | June 9, 1908 |
| 1,782,462 | Chappuzeau et al. | Nov. 25, 1930 |
| 2,067,804 | Thorne | Jan. 12, 1937 |
| 2,124,579 | Kneer et al. | July 26, 1938 |
| 2,185,589 | Drake et al. | Jan. 2, 1940 |
| 2,217,733 | De Forest | Oct. 15, 1940 |
| 2,218,784 | Billstein | Oct. 22, 1940 |
| 2,220,881 | Barnes et al. | Nov. 12, 1940 |
| 2,359,894 | Brown et al. | Oct. 10, 1944 |